(12) United States Patent
Wu et al.

(10) Patent No.: US 12,347,198 B2
(45) Date of Patent: Jul. 1, 2025

(54) METHODS, SYSTEMS, DEVICES, MEDIA AND PRODUCTS FOR VIDEO PROCESSING

(71) Applicant: Beijing Youzhuju Network Technology Co., Ltd., Beijing (CN)

(72) Inventors: Junfeng Wu, Beijing (CN); Song Bai, Singapore (SG); Yi Jiang, Beijing (CN); Wenqing Zhang, Beijing (CN); Bin Lu, Los Angeles, CA (US)

(73) Assignee: Beijing Youzhuju Network Technology Co., Ltd., Beijing (CN)

(*) Notice: Subject to any disclaimer, the term of this patent is extended or adjusted under 35 U.S.C. 154(b) by 0 days.

(21) Appl. No.: 18/732,477

(22) Filed: Jun. 3, 2024

(65) Prior Publication Data

US 2024/0320976 A1    Sep. 26, 2024

Related U.S. Application Data

(63) Continuation of application No. PCT/CN2022/130306, filed on Nov. 7, 2022.

(30) Foreign Application Priority Data

Dec. 14, 2021 (CN) .......................... 202111531860.4

(51) Int. Cl.
*G06V 20/40* (2022.01)
*G06V 10/764* (2022.01)
*G06V 10/77* (2022.01)

(52) U.S. Cl.
CPC ............ *G06V 20/46* (2022.01); *G06V 10/764* (2022.01); *G06V 10/7715* (2022.01); *G06V 20/49* (2022.01)

(58) Field of Classification Search
CPC .. G06V 20/46; G06V 10/764; G06V 10/7715; G06V 20/49
See application file for complete search history.

(56) References Cited

U.S. PATENT DOCUMENTS 11,804,042 B1* 10/2023 Alokhina ............. G06V 10/776
2017/0098312 A1* 4/2017 Souchard ................ G06T 7/579
(Continued)

FOREIGN PATENT DOCUMENTS

| CN | 109344703 A | 2/2019 |
| CN | 110838132 A | 2/2020 |

(Continued)

OTHER PUBLICATIONS

Zhu, X. et al., "Deformable DETR: Deformable Transformers for End-To-End Object Detection," Proceedings of International Conference on Learning Representations (ICLR) 2021 Oral, 2021, 16 pages.

(Continued)

*Primary Examiner* — Santiago Garcia
(74) *Attorney, Agent, or Firm* — Alleman Hall & Tuttle LLP

(57) ABSTRACT

According to embodiments of the disclosure, a method, system, device, medium and product for video processing are provided. The method includes extracting a plurality of feature maps from a plurality of frames of a video respectively; determining a plurality of frame-level features of a video instance in the plurality of frames based on the plurality of feature maps respectively, a frame-level feature in each of the frames representing feature information of the video instance in the frame; determining a video-level feature of the video instance by aggregating the plurality of frame-level features, the video-level feature representing feature information of the video instance across the plurality of frames; and determining an analysis result for the video instance in the plurality of frames based at least on the video-level feature.

18 Claims, 4 Drawing Sheets

(56) References Cited

U.S. PATENT DOCUMENTS

| | | | |
|---|---|---|---|
| 2017/0343481 A1 | 11/2017 | Jahanshahi et al. | |
| 2019/0228264 A1* | 7/2019 | Huang | G06V 10/993 |
| 2021/0224546 A1* | 7/2021 | Lu | G06N 3/045 |
| 2021/0349940 A1* | 11/2021 | Chen | G06V 20/49 |
| 2021/0383169 A1* | 12/2021 | Wang | G06T 7/207 |
| 2022/0058452 A1* | 2/2022 | Zhang | G06T 1/0007 |
| 2022/0101007 A1* | 3/2022 | Kadav | G06N 3/08 |
| 2022/0104463 A1* | 4/2022 | Spears | G06T 7/11 |
| 2022/0138913 A1* | 5/2022 | Huang | G06V 10/62 |
| | | | 348/241 |
| 2022/0222776 A1* | 7/2022 | Porikli | G06T 7/248 |
| 2022/0256175 A1* | 8/2022 | Jain | H04N 19/136 |
| 2022/0327315 A1* | 10/2022 | Kumar | G06N 3/08 |
| 2023/0042187 A1* | 2/2023 | Wu | G06V 10/80 |
| 2023/0047673 A1* | 2/2023 | Kim | G09G 3/3208 |
| 2023/0085518 A1* | 3/2023 | Chen | G06V 10/7715 |
| | | | 382/103 |
| 2023/0096850 A1* | 3/2023 | Wang | G16H 50/20 |
| | | | 382/103 |
| 2024/0161461 A1* | 5/2024 | Zu | G06V 10/82 |

FOREIGN PATENT DOCUMENTS

| | | |
|---|---|---|
| CN | 111104930 A | 5/2020 |
| CN | 111783731 A | 10/2020 |
| CN | 112560827 A | 3/2021 |
| CN | 112651267 A | 4/2021 |
| CN | 113039555 A | 6/2021 |
| CN | 113313065 A | 8/2021 |
| CN | 113343810 A | 9/2021 |
| CN | 113627266 A | 11/2021 |
| CN | 113673489 A | 11/2021 |
| CN | 114170558 A | 3/2022 |
| WO | 2020233427 A1 | 11/2020 |

OTHER PUBLICATIONS

China National Intellectual Property Administration, Office Action and Search Report Issued in Application No. 202111531860.4, Sep. 5, 2023, 11 pages.

Wu, J. et al., "SeqFormer: Sequential Transformer for Video Instance Segmentation," Proceedings of European Conference on Computer Vision (ECCV) 2022 Oral, 2022, 21 pages.

European Patent Office, Extended European Search Report for European Application No. 22906113.0, mailed Jan. 29, 2025, 8 Pages.

Hwang et al., "Video Instance Segmentation using Inter-Frame Communication Transformers", NeurIPS 2021 (Thirty-Fifth Annual Conference on Neural Information Processing Systems), Dec. 6, 2021 (Dec. 6, 2021), pp. 1-12, XP093239135,. 12 pages.

Wang Yuqing et al.: "End-to-End Video Instance Segmentation with Transformers," 2021 IEEE/CVF Conference on Computer Vision and Pattern Recognition (CVPR), IEEE, Jun. 20, 2021, XP034008149, pp. 8737-8746. 10 pages.

* cited by examiner

METHODS, SYSTEMS, DEVICES, MEDIA AND PRODUCTS FOR VIDEO PROCESSING

CROSS REFERENCE OF RELATED APPLICATION(S)

This application is a continuation of International Patent Application No. PCT/CN2022/130306, filed on Nov. 7, 2022, which claims the benefit of CN Patent Application No. 202111531860.4 filed on Dec. 14, 2021, both of which are incorporated herein by reference in their entireties.

FIELD

Example embodiments of the present disclosure relate generally to the field of computer vision, and in particular to a method, system, device, medium and product for video processing.

BACKGROUND

Video instances (or simply "instances") refer to objects presented in a video. In the field of video processing, it is expected to perform various analysis tasks on video instances. An example analysis task includes video instance segmentation, which means that for a given video, the video instances in it need to be identified, and the corresponding pixel part of each video instance on each frame is found to generate a mask corresponding to the video instance. In an application scenario of video editing, these masks can be used to cut out, erase, and replace the foreground and background of the corresponding video instances from each frame. Other instance-related analysis tasks include classifying video instances, locating video instances in individual frames, and so on.

SUMMARY

According to example embodiments of the present disclosure, a video processing scheme is provided.

In a first aspect of the present disclosure, a method for video processing is provided. The method comprises: extracting a plurality of feature maps from a plurality of frames of a video respectively; determining a plurality of frame-level features of a video instance in the plurality of frames based on the plurality of feature maps respectively, a frame-level feature in each of the frames representing feature information of the video instance in the frame; determining a video-level feature of the video instance by aggregating the plurality of frame-level features, the video-level feature representing feature information of the video instance across the plurality of frames; and determining an analysis result for the video instance in the plurality of frames based at least on the video-level feature. According to the embodiments of the present disclosure, the video-level feature obtained by aggregating frame-level features can be used to determine more accurate analysis results for the video instance in the plurality of frames, ensuring the continuity and robustness of video instance analysis.

In a second aspect of the present disclosure, a system for video processing is provided. The system comprises at least one processing unit; and at least one memory coupled to the at least one processing unit and storing instructions for execution by the at least one processing unit. The instructions, when executed by at least one processing unit, cause the system to perform acts of: extracting a plurality of feature maps from a plurality of frames of a video respectively; determining a plurality of frame-level features of a video instance in the plurality of frames based on the plurality of feature maps respectively, a frame-level feature in each of the frames representing feature information of the video instance in the frame; determining a video-level feature of the video instance by aggregating the plurality of frame-level features, the video-level feature representing feature information of the video instance across the plurality of frames; and determining an analysis result for the video instance in the plurality of frames based at least on the video-level feature.

In a third aspect of the present disclosure, a device for video processing is provided. The device includes a feature map extraction unit configured to extract a plurality of feature maps from a plurality of frames of a video respectively; a frame-level feature determination unit configured to determine a plurality of frame-level features of a video instance in the plurality of frames based on the plurality of feature maps respectively, a frame-level feature in each of the frames representing feature information of the video instance in the frame; a feature aggregation unit configured to determine a video-level feature of the video instance by aggregating the plurality of frame-level features, the video-level feature representing feature information of the video instance across the plurality of frames; and an analysis result determination unit configured to determine an analysis result for the video instance in the plurality of frames based at least on the video-level feature.

In a fourth aspect of the present disclosure, a computer-readable storage medium is provided. The medium stores a computer program which, when executed by a processor, implements the method of the first aspect.

In a fifth aspect of the present disclosure, a computer-readable storage medium is provided. The medium stores a computer program which, when executed by a processing unit, implements the method of the first aspect.

In a sixth aspect of the present disclosure, a computer program product is provided. The computer program product includes a computer program executable by a processing unit which includes instructions for performing the method of the first aspect.

It would be appreciated that the content described in the section is neither intended to identify the key features or essential features of the present disclosure, nor is it intended to limit the scope of the present disclosure. Other features of the present disclosure will be readily understood through the following description.

BRIEF DESCRIPTION OF THE DRAWINGS

The above and other features, advantages and aspects of the various embodiments of the present disclosure will become more apparent in combination with the accompanying drawings and with reference to the following detailed description. In the drawings, the same or similar reference symbols refer to the same or similar elements, where.

DETAILED DESCRIPTION

Figure 1:
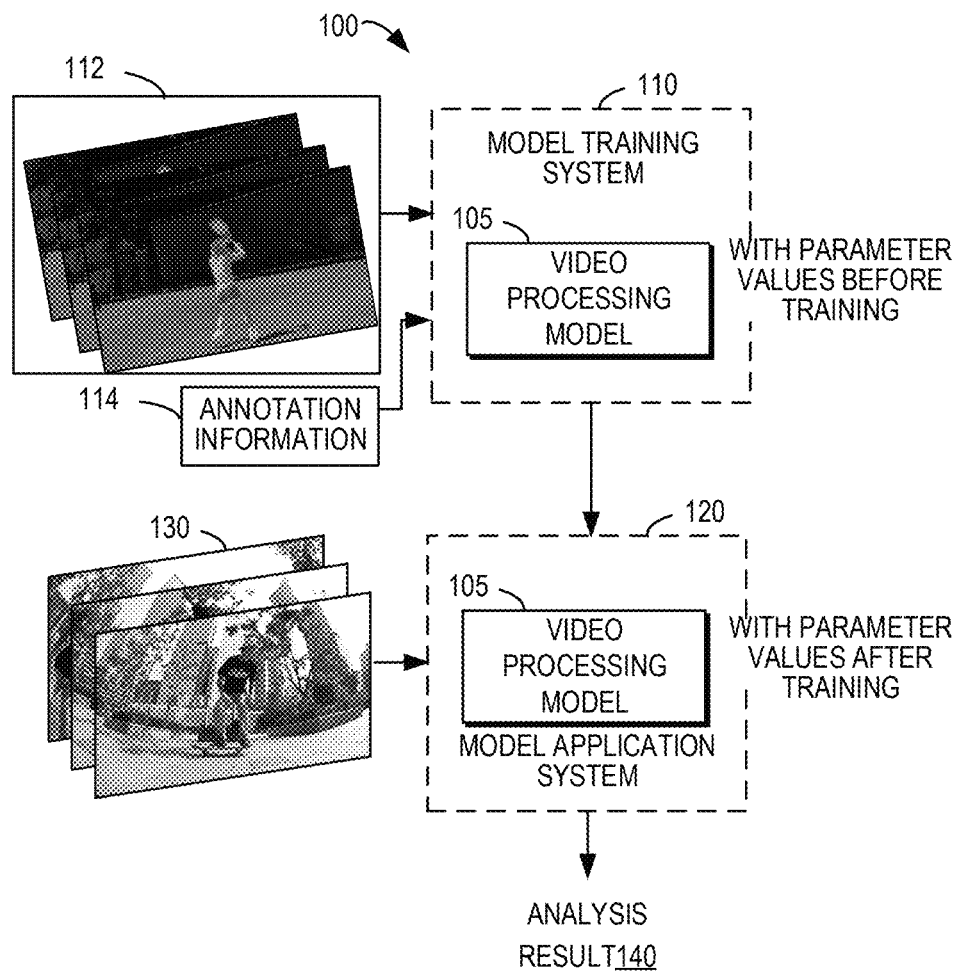
FIG. 1 shows a schematic diagram of an example environment in which embodiments of the present disclosure can be implemented.

Embodiments of the present disclosure will be described in more detail below with reference to the accompanying drawings. Although certain embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. A thorough and complete understanding of this disclosure. It would be appreciated that the accompanying drawings and embodiments of the present disclosure are only for the purpose of illustration and are not intended to limit the scope of protection of the present disclosure.

In the description of embodiments of the present disclosure, the term "include"/"comprise" and similar terms should be understood as an open-ended inclusion, that is, "including but not limited to." The term "based on" should be interpreted as "based at least in part on." The term "an embodiment" or "the embodiment" should be interpreted as "at least one embodiment". The term "some embodiments" should be understood as "at least some embodiments". Other explicit and implicit definitions may be included below.

As used herein, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using a plurality of layers of processing units. The neural network used in the deep learning generally includes a lot of hidden layers, which increase the depth of the network. A neural networks model is an example of a deep learning-based model. As used herein, "model" may also be referred to as "machine learning model", "learning model", "machine learning network", or "learning network", and these terms are used interchangeably herein.

Generally, machine learning can roughly include three phases, namely a training phase, a testing phase and an application phase (also referred to as inference phase). In the training phase, a given model can be trained using a large amount of training data, and parameter values are continuously updated iteratively until the model can obtain inferences from the training data that consistently meet the expected goals. Through training, a model can be thought of as being able to learn correlations from inputs to outputs (also known as input-to-output mappings) from the training data. The parameter values of the trained model are determined. In the testing phase, test inputs are applied to the trained model to test whether the model can provide the correct output, thereby determining the performance of the model. In the application phase, the model can be used to process the actual input and determine the corresponding output based on the parameter values obtained through training.

FIG. 1 illustrates a block diagram of an environment 100 in which various implementations of the present disclosure can be implemented. In the environment 100 of FIG. 1, it is desirable to train and use a video processing model 105 for performing analysis tasks for video instances in various frames of the video.

The environment 100 includes a model training system 110 and a model application system 120. In example embodiments of FIG. 1 and some example embodiments that will be described below, the model training system 110 is configured to utilize training data to train the video processing model 105 to optimize parameter values of the video processing model 105, thereby obtaining trained parameter values. The training data includes a plurality of sample videos 112 and annotation information 114 associated with respective sample videos 112. The annotation information 114 relates to the analysis tasks that the video processing model 105 is expected to perform.

Before training, the parameter values of the video processing model 105 may be initialized, or pretrained parameter values may be obtained by a pre-training process. After the training process of the model training system 110, the parameter values of the video processing model 105 are updated and adjusted. After the training is completed, the video processing model 105 is with the trained parameter values. The trained video processing model 105 can be used by the model application system 120 to perform corresponding analysis tasks. The model application system 120 can utilize the trained video processing model 105 to perform an analysis task on a video to be processed 130 to output an analysis result 140.

In some embodiments, the video processing model 105 is configured to perform video instance segmentation tasks. It is desired that the video processing model 105 is configured to, for each video instance, determine the instance segmentation results in each frame of the video to indicate to present pixel portions of respective video instances in each frame. For example, in the example of FIG. 1, it is assumed that video 130 to be analyzed captures skateboarding. The desired instance segmentation result is the corresponding pixel portion of each video instance (including skateboarders and skateboards) in each frame.

In some embodiments, the video processing model 105 is configured to perform video instance classification tasks. The video instance classification task is to classify all video instances appearing in the video. The classification results can indicate a probability that each video instance belongs to a predetermined category.

In some embodiments, the video processing model 105 is configured to perform video instance localization tasks. The video instance localization task determines boundary box information of the video instance in each frame to indicate a coordinate of boundary box of the video instance in the frame.

In FIG. 1, the model training system 110 and the model application system 120 can be any system with computing capabilities, such as various computing devices/systems, terminal devices, servers, and so on. The terminal device may be any type of mobile terminal, fixed terminal or portable terminal, including mobile phone, desktop computer, laptop computer, notebook computer, netbook computer, tablet computer, media computer, multimedia tablet, or any combination of the foregoing, including accessories and peripherals for these devices or any combination thereof. Servers include, but are not limited to, mainframes, edge computing nodes, computing devices in cloud environments, and so on.

It should be understood that components and arrangements in the environment illustrated in FIG. 1 are examples only, and computing systems suitable for implementing example embodiments described in this disclosure may include one or more different components, other components, and/or different arrangements. For example, although shown as separated, the model training system 110 and model application system 120 may be integrated in the same system or device. Embodiments of the present disclosure are not limited in this respect.

Figure 2:
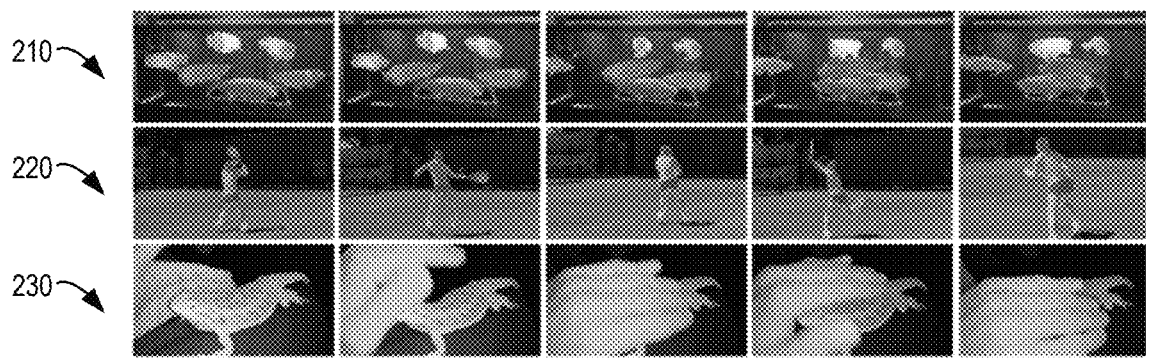
FIG. 2 shows a plurality of frames of some example videos to be analyzed.

In the analysis of video instances, a position, shape, size and appearance of a certain video instance in each frame may change. For example, problems, such as deformation, occlusion, motion blur and so on, may occur, which will lead to difficult analysis of the video instance. FIG. 2 shows a plurality of frames of some example videos to be analyzed. A video 210 presents multiple fish in an aquarium. Due to rain swimming motion, some fish will experience motion blur or be obscured by other fish. A video 220 presents a tennis clip, in which as the tennis player swings the racket, hits the ball and so no, the tennis racket and the tennis ball may be in different positions in different frames, and then appear again after being blocked by the player. In a video 230, with movements of the human hand, the lizard may appear completely, partially occluded, or severely occluded (so that the object is difficult to identify from a single frame).

In the video instance segmentation task, a common solution is to first perform picture-level instance segmentation on each frame, and then match the instance segmentation results on each frame with features of the previous and subsequent frames to obtain a continuous segmentation results of a certain video instance in the entire video. The significant flaw of this solution is that when the video instance is significantly deformed or occluded, the feature matching of the previous and subsequent frames is prone to errors, resulting in the video instance of the subsequent frame being unable to be matched to the corresponding video instance of the previous frame. Such matching errors will gradually accumulate as the video lengthens, resulting in discontinuous video segmentation results of objects over the entire video. For video instance classification tasks and boundary box positioning tasks, similar problems exist, resulting in the inability to obtain unified classification results and boundary box positioning results for the same video instance in the video.

Typically, for a given video, humans are able to identify each video instance and, are able to associate objects in each frame to the same video instance throughout the video, regardless of how that video instance appears and where it occurs in different frames what a change. If a video instance is occluded or has motion blur in some frames, humans are still able to re-identify the video instance from other frames through contextual information. In other words, for the same video instance in different frames of the video, it is expected to be able to correlate the instances as a whole, rather than consider them to be different objects. This facilitates consistent processing of the same video instances in video analysis tasks. For example, in a video editing application based on instance segmentation results, determining the segmentation result for the same video instance in the entire video can ensure that the cutout, erasure, or replacement operations are uniformly applied to the video instance in each frame. However, as analyzed above, conventional video processing schemes are difficult to guarantee consistent analysis of video instances throughout the video.

According to the embodiments of the present disclosure, an improved video processing scheme is proposed. According to this scheme, a feature capture of a video instance is performed independently in each frame of the video to determine frame-level features of the video instances in each frame. A video-level feature for that video instance is determined by aggregating the frame-level features determined from a plurality of frames. This video-level feature can characterize feature information of the corresponding video instance in the entire video. In other words, the video-level feature can model the feature information of a certain video instance in the entire video. Based on this video-level feature, more accurate analysis results for this video instance in the plurality of frames can be determined, ensuring continuity and robustness of video instance analysis.

In example embodiments of the present disclosure, machine learning models are utilized to implement video processing tasks as previously described. For example, the video processing tasks extracted by the present disclosure can be implemented by training and applying the video processing model 105 as shown in the environment 100 of FIG. 1.

Figure 3:
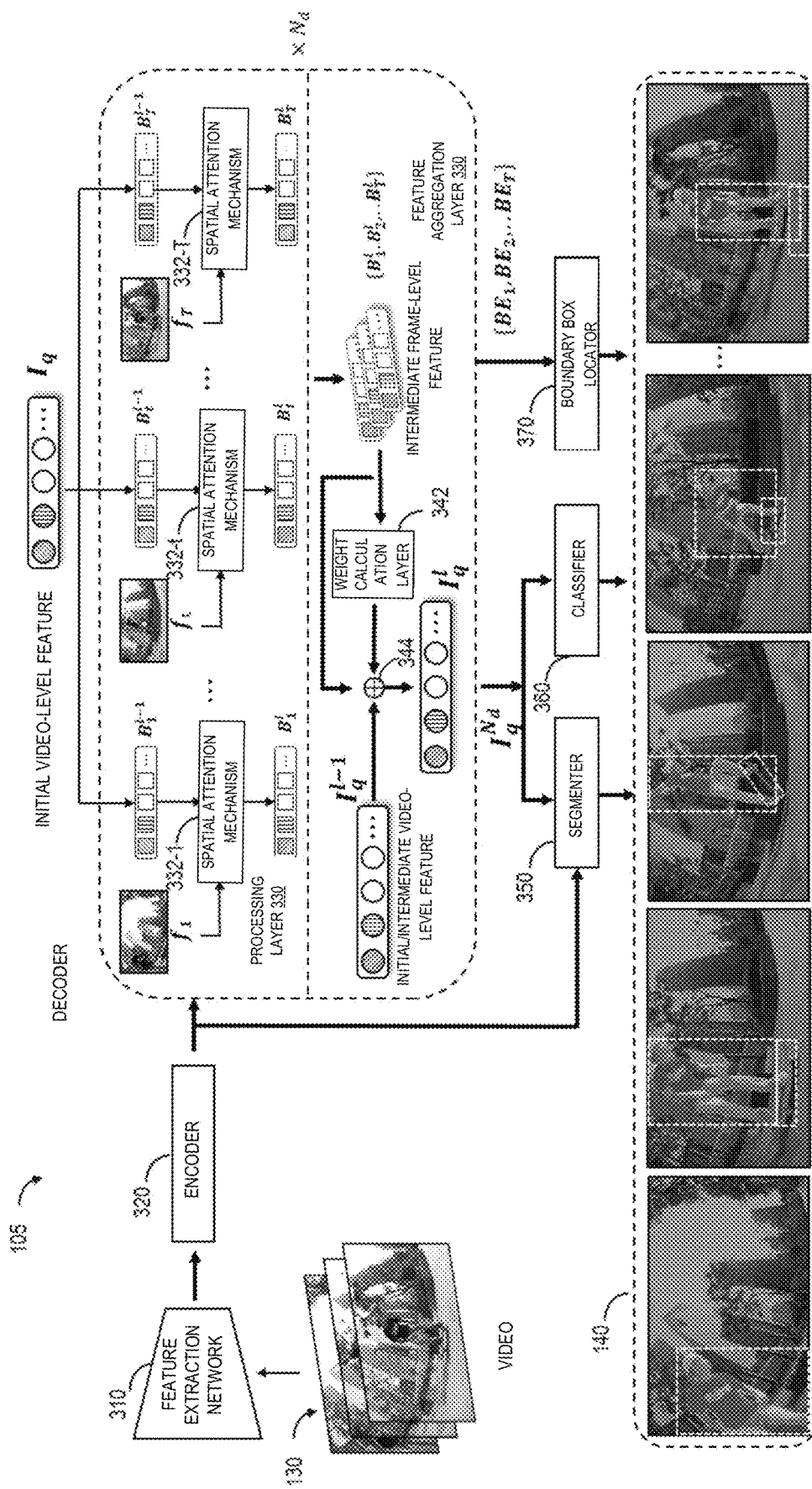
FIG. 3 shows a block diagram of a video processing model according to some embodiments of the present disclosure.

FIG. 3 shows a block diagram of a video processing model 105 according to some embodiments of the present disclosure. The video processing model 105 is configured to perform a determination of frame-level features of a certain video instance in each frame, determine a video-level feature of the video instance by a temporal feature aggregation, and determine an analysis result for this video instance in the plurality of frames of the video based on the video-level features.

The video processing model 105 can be based on various types of neural network architectures. It is expected that the applied architecture of the video processing model 105 can implement a feature map extraction of video frames, and a subsequent frame-level feature determination based on the feature map.

In embodiments shown in FIG. 3, the architecture of the video processing model 105 is based on a Transformer architecture suitable for computer vision tasks, including a feature extraction network 310, an encoder 320 and a decoder part (including one or more processing layers 330). In embodiments of the present disclosure, as briefly described above, it is expected that the video processing model 105 can implement the aggregation of frame-level features to obtain the video-level feature. Therefore, as shown in FIG. 3, the video processing model 105 also includes one or more feature aggregation layers 340, each feature aggregation layer 340 is associated with a processing layer 330. A plurality of feature aggregation layers 340 are configured to perform the aggregation of frame-level features of the video instance. In FIG. 3, it is assumed that the number of processing layers 330 is $N_d$, and the number of feature aggregation layers 340 is also $N_d$, where $N_d$ is greater than or equal to 1.

The video processing model 105 also includes a module for determining the analysis result to determine the analysis result for an analysis task for the video. In example embodiments of FIG. 3, there are three modules for determining the analysis result, including a segmenter 350, a classifier 360 and a boundary box locator 370. It should be understood that one or more of these three modules can be omitted, or modules that implement other analysis tasks may also exist.

Parameter values of various parts in the video processing model 105 may be determined through a training process. In the following, a working principle of the video processing model 105 in the model application phase is first described, and then the training of the video processing model 105 is described. In the model application phase, the operation of the video processing model 105 may be implemented in the model application system 120 of FIG. 1.

The feature extraction network 310 and the encoder 320 are configured to respectively extract a plurality of feature maps from a plurality of frames of the video 130 to be analyzed. In some embodiments, the feature extraction network 310 may be implemented by including a neural network suitable for processing images, such as a convolutional neural network (CNN). The encoder 320 and a subsequent decoder composed of the plurality of processing layers 330 constitute the network architecture of the Transformer. Accordingly, the encoder 320 may be configured to perform further feature extraction based on the results of the feature extraction network 310.

The video input to the video processing model 105 can be a video of any length, including a certain number of frames. Suppose that the video to be processed includes T frames, each frame is with 3 color channels (this depends on a color space used to represent the frames). The input video can be represented as $x_v \in \mathbb{R}^{T \times 3 \times H \times W}$, where the frame has T frames, each frame has 3 color channels, and a resolution of each frame is H×W (H represents the height of the frame, W represents the width of the frame).

When extracting the feature map, the feature extraction network 310 may extract the intermediate feature map of each frame in the video 130, respectively. The intermediate feature map of each frame is provided to the encoder. The encoder 320 further processes the intermediate feature maps of the frames to determine the feature map for each frame (denoted as $\{f_t\}_{t=1}^{T}$). This feature map can represent overall visual feature information of each frame.

In some embodiments, the encoder 320 may include a convolutional layer for reducing the channel dimension of each intermediate feature map obtained from the feature extraction network 310 to a predetermined dimension C, thereby obtaining a new feature map of each frame in the video 130. The new intermediate feature map of each frame is represented as $\{f'_t\}_{t=1}^{T}$, $f'_t \in \mathbb{R}^{C \times H' \times W'}$, $t \in [1,T]$. Dimensions C can be predetermined values like 256 or any other value. In some embodiments, the encoder 320 may also include a deformable attention layer for performing a deformable attention mechanism on the intermediate feature maps $\{f'_t\}_{t=1}^{T}$ to output a feature map for each frame (denoted $\{f_t\}_{t=1}^{T}$). In some embodiments, the encoder 320 may output the feature map (denoted $\{f_t\}_{t=1}^{T}$) of each frame to have a predetermined resolution, such as the same resolution as the individual frames in the video 130.

It should be understood that only some example implementations of the feature extraction network 310 and the encoder 320 are given above. The feature extraction network 310 and the encoder 320 can also be based on other feature extraction architectures, as long as the feature map extraction of the frame can be achieved. In some embodiments, the feature extraction network 310 can be incorporated into the encoder 320. Embodiments of the present disclosure do not impose restrictions on frame feature map extraction.

On the decoder side, the frame-level features of a given video instance in each frame are determined based on a plurality of feature maps to characterize the feature information of the video instance in the frame. Frame-level features may capture feature information related to the given video instance from the feature map of each frame. A plurality of frame-level features determined for one video instance amongst the plurality of frames are aggregated to generate a video-level feature. As used herein, "feature" refers to feature information in the form of multi-dimensional vectors, which can also be referred to as "feature representation" or "embedded representation", etc.

Considering that the appearance and position of a video instance may change in different frames, frame-level features can focus on the feature information presented by the video instance in each frame. Therefore, each frame-level feature can be considered as an anchor point of the video instance on the corresponding frame, which is used to obtain and locate the feature information of the video instance on the corresponding frame. Then, by aggregating the frame-level features of the video instance on the plurality of frames, global feature information of the video instance at the video-level, that is, the video-level feature can be obtained.

In some embodiments, since the exact number of video instances appearing in the video may not be determined when analyzing the video, a predetermined number of video instances can be set to exist in the video (expressed as N). These video instances can be indexed from 1, 2, . . . , N. For each indexed video instance, the frame-level features of the video instance can be determined from the plurality of frames and aggregated into the final video-level feature. The values of N can be set to large values (e.g., 90, 100, 150, etc.) to cover the number of video instances that may appear in different input videos. It can be understood that if the number of video instances appearing in the currently processed video is less than the predetermined number N, then for the redundantly set video instances, no useful feature information will be extracted from the video. Subsequent analysis results will also be ignored.

In some embodiments, in order to increase the learning depth of frame-level and video-level feature information, the plurality of processing layers 330 are utilized to perform the extraction of frame-level features, and the plurality of feature aggregation layers 340 are utilized to perform the aggregation of frame-level features, that is, $N_d$ is greater than 1.

The process of determining video-level features for a given video instance will be described below with reference to the processing layer 330 and the feature aggregation layer 340 of FIG. 3.

At each of the plurality of processing layers 330, frame-level features of a certain video instance in T frames may be determined based on a plurality of feature maps $\{f_t\}_{t=1}^{T}$ extracted from the plurality of frames of the video 130. In some embodiments, a spatial attention mechanism can be used to determine the frame-level features of the video instance in each frame based on the feature map in each frame. For example, as shown in FIG. 3, each processing layer 330 may include T spatial attention mechanism modules 332-1, . . . 332-t . . . 332-T corresponding to T frames respectively (for ease of discussion, collectively or individually referred to as the spatial attention mechanism module 332).

Suppose there are at most N video instances in the video. For each video instance, initial video-level features for that video instance can be initialized, assumed to be represented as $I_q \in \mathbb{R}^C$. The following describes the determination of frame-level features and the video-level feature from the perspective of a video instance. In some embodiments, the processing layer 330 and the feature aggregation layer 340 may perform the determination of frame-level features and video-level features for N video instances in parallel.

Numbers of processing layers 330 may be configured to determine frame-level features of the video instance at individual frames iteratively. At a first processing layer of the plurality of processing layers 330, the initial video-level features may be determined as initial frame-level features of the video instance in each frame. In the first processing layer 330, the spatial attention mechanism module 332 corresponding to each frame t is configured to generate, unitizing the spatial attention mechanism, an intermediate frame-level feature of the video instance at the first processing layer based on the initial frame-level features and a feature map $f_t$ extracted from the frame t, which can be expressed as:

$$B_t^1 = DeformAttn(I_q, f_t) \qquad (1)$$

where $B_t^1 \in \mathbb{R}^C$ represents the intermediate frame-level feature generated at the first processing layer 330 for frames t; DeformAttn( ) represents the spatial attention mechanism utilized by the spatial attention mechanism module 332. The spatial attention mechanism is an attention mechanism applied in the spatial domain of the frame to perform a corresponding spatial transformation on the spatial domain information in the feature map of the frame, thereby extracting key feature information related to the video instance in the feature map. There are various variations of the spatial attention mechanism, and embodiments of the present disclosure are not limited in this respect.

In the l-th processing layer 330 after the first processing layer 330, the spatial attention mechanism module 332 corresponding to each frame t is configured to generate, unitizing the spatial attention mechanism, an intermediate frame-level feature of the video instance at the l-th processing layer based on the frame-level feature $B_t^{l-1}$ generated at a previous processing layer (the (l-1)-the processing layer 330) and the feature map $f_t$ extracted from the frame t, which can be expressed as:

$$B_t^l = DeformAttn(B_t^{l-1}, f_t). \qquad (2)$$

In each processing layer 330, for T frames in the video 130, T spatial attention mechanism modules 332 are generated in a similar manner to generate T intermediate frame-level features for the given video. For N video instances, each processing layer 330 can generate N×T intermediate frame-level features. After passing through $N_d$ processing layers 330, for each video instance, T intermediate frame-level features generated by the last processing layer 330 can be determined as T frame-level features of the video instance in T frames of the video 130. The frame-level features of N video instances in all T frames can be represented as $\{BE_t\}_{t=1}^T$, $BE_t \in \mathbb{R}^{N \times d}$.

As previously mentioned, the video processing model 105 includes a feature aggregation layer 340 associated with each processing layer 330. At each of the $N_d$ feature aggregation layers 340, a frame-level feature aggregation across the plurality of frames may be performed. The feature aggregation layers 340 are configured to aggregate T intermediate frame-level features generated at each processing layer 330. Similar to the processing layer 330, the final video-level feature may be aggregated in an iterative manner through $N_d$ feature aggregation layers 340, where each feature aggregation layer 340 is configured to determine the inter video-level feature based on the previous feature aggregation layer 340, and determine the intermediate video-level feature of the current feature aggregation layer 340 based on an aggregation result of the intermediate frame-level features received from the current feature aggregation layer 340.

In some embodiments, the feature aggregation layers 340 may perform the feature aggregation through a weighted sum. As shown in FIG. 3, the feature aggregation layer 340 includes a weight calculation layer 342 and an aggregation module 344. In the l-th feature aggregation layer 340 (the value of l ranges from 1 to $N_d$), the weight calculation layer 342 is configured to calculate and determine a weight of intermediate frame-level features $B_t^l$ generated at the l-th processing layer 330. At the l-th processing layer 330, the weight of each intermediate frame-level feature $B_t^l$ indicates how important the frame-level features in the t-th frame are to the video-level features of the video instance.

In some embodiments, the weight calculation layer 342 can be based on a fully connected (FC) layer, of which input is the intermediate frame-level feature $B_t^l$ and the output is the corresponding weight. In some embodiments, the parameter values of the weight calculation layer 342 and other parts of the video processing model 105 are jointly determined during the training process in an end-to-end manner.

Each intermediate frame-level feature $B_t^l$ and its weight are provided to the aggregation module 344. The aggregation module 344 in the l-th feature aggregation layer 340 uses the determined weight to weight the corresponding intermediate frame-level features $B_t^l$, and superimposes the weighted results on the intermediate video-level features $I_q^{l-1}$ output by the previous feature aggregation layer 340, to obtain the intermediate video-level features $I_q^l$ output by the l-th feature aggregation layer 340. The feature aggregation operation at the l-th feature aggregation layer 340 can be expressed as:

$$I_q^l = \frac{\sum_{t=1}^T B_t^l \times FC(B_t^l)}{\sum_{t=1}^T FC(B_t^l)} + I_q^{l-1} \qquad (3)$$

where $FC(B_t^l)$ represents the weight of the intermediate frame-level feature $B_t^l$ determined by the weight calculation layer 342.

In formula (3), for the first feature aggregation layer 340 (i.e., l=1), based on the weighted sum of the intermediate frame-level features $B_t^l$, it can add the initial video-level feature $I_q$ to generate the intermediate video-level feature corresponding to this feature aggregation layer. According to formula (3), in the last feature aggregation layer 340 (i.e., l=$N_d$), an intermediate video-level feature can be obtained by a weighting aggregation on the final frame-level features of the video instance in T frames, and superimposed on the intermediate video-level features generated by the previous feature aggregation layer 340, to obtain the final video-level feature of the video instance across T frames which is represented as $I_q^{N_d}$.

For N video instances, each feature aggregation layer 340 can generate N intermediate video-level features. At the last feature aggregation layer 340, N final video-level features for the N video instances can be generated.

The frame-level features of each video instance can be used to perform analysis tasks on the video instance. Because the video-level features of the video instance aggregate feature information related to the video instance in each frame, it can more effectively characterize the motion and changes of the video instance across the plurality of frames, and therefore can be used for more accurate analysis of the video instance.

In some embodiments, the classifier 360 in the video processing model 105 is configured to perform classification tasks for video instances in the video 130. The classifier 360 is configured to determine an instance classification result of the video instance based on the video-level features $I_q^{N_d}$ of each video instance, the classification result indicates a probability that the video instance belongs to one of a plurality of predetermined categories. For example, for a video instance with index $\sigma(i)$ ($i=1, 2, \ldots, N$), the classifier 360 can determine the probability of the video instance belonging to the predetermined category $c_i$ based on the frame-level features corresponding to the video instance, which is expressed as $\hat{p}_{\sigma(i)}(c_i)$. The predetermined categories $c_i$ can be an empty set $\emptyset$. Through video-level features, it is possible to determine the classification results of individual video instances that have appeared in the entire video 130, and to avoid classifying video instances that disappear in some frames and then reappear in other frames into different instances.

The classifier 360 can be implemented based on various model architectures. For example, the classifier 360 may map video-level features of video instances to classification results based on a linear projection layer. The scope of embodiments of the present disclosure is not limited in terms of the architecture of the classifier, as long as the classification result of the video instance can be determined based on the video-level features.

In some embodiments, the segmenter 350 in the video processing model 105 is configured to determine, based at least on the video-level feature of the video instance and a plurality of feature maps obtained from the encoder 320, instance segmentation results in each of the plurality of frames of the video 130. The instance segmentation result indicates the pixel portion of the video instance that is rendered in each frame. In some examples, the instance segmentation results may be expressed in the form of masks. The size of the mask is the same as the size of the frame in video 130, and the value of each pixel in the mask can indicate whether the corresponding pixel in the frame belongs to a certain video instance.

In some embodiments, the boundary box locator 370 in the video processing model 105 is configured to locate a certain video instance in one or more frames of the video 130. Specifically, the boundary box locator 370 is configured to respectively determine the boundary box information of a certain video instance in the corresponding frame based on the frame-level features $BE_t$ of one or more frames of the video 130. The boundary box information indicates the boundary box coordinates of the video instance in the corresponding frame, such as the center coordinates, height, width, etc. of the boundary box. For a video instance with index $\sigma(i)$ ($i=1, 2, \ldots, N$), the boundary box locator 370 can determine the boundary box information of the video instance in each frame, which is represented as $\hat{b}_{\sigma(i)} = \{\hat{b}_{(\sigma(i),1)}, \hat{b}_{(\sigma(i),2)}, \ldots, \hat{b}_{(\sigma(i),T)}\}$.

The frame-level features of the video instance represent the feature information of the video instance in a specific frame. Accordingly, the boundary box locator 370 may utilize corresponding frame-level features to locate video instances in one, some, or all T frames of video 130 as desired. In some cases, the video instance may not exist in some frames, and accordingly, the frame-level features corresponding to these frames may not capture feature information about the video instance. The boundary box locator 370 will not locate the video instance from these frames.

The boundary box locator 370 can be implemented based on various model architectures. For example, the boundary box localizer 370 may be based on a multi-layer feed-forward network (FFN) and a linear projection layer. The scope of embodiments of the present disclosure is not limited in terms of the architecture of the boundary box locator, as long as the boundary box information of the video instance can be determined based on frame-level features.

In some embodiments, when determining the instance segmentation result for a certain video instance, a plurality of frame-level features $BE_t$ of the video instance in the plurality of frames can also be utilized. Specifically, the plurality of frame-level features $BE_t$ of the video instance in the plurality of frames can be used to determine the boundary box information of the video instance in each frame. The boundary box information in each frame can be concatenated with the feature map for input to the segmenter 350.

In some embodiments, the segmenter 350 may include FFN for processing video-level features. FFN can encode video-level features of video instances with index $\sigma(i)$ into parameters $\omega_i$. In some embodiments, for the plurality of feature maps obtained from the encoder 320, the segmenter 350 may also include an FFN for further processing these feature maps to obtain a feature map sequence $\{\hat{F}_{mask}^1, \hat{F}_{mask}^2, \ldots, \hat{F}_{mask}^T\}$, where the feature map $\hat{F}_{mask}^t$ corresponding to each frame can be transformed to have smaller resolution and fewer channels. For the t-th frame, the corresponding feature map $\hat{F}_{mask}^t$ can be concatenated with the boundary box information $b_{(\sigma(i),t)}$ determined based on the frame-level features of the frame to provide position information of the video instance in the frame. This facilitates faster and more accurate identification of the pixel portion that belong to that video instance. By concatenating boundary box information, a new feature map sequence mask $\{F_{mask}^t\}_{t=1}^T$ can be obtained. The segmenter 350 may include a segmentation result generation layer that predicts the instance segmentation results of the video instances in each frame based on the feature map sequence mask $\{F_{mask}^t\}_{t=1}^T$ and the parameters $\omega_i$. This can be expressed as:

$$\{m_i^t\}_{t=1}^T = \{MaskHead(F_{mask}^t, \omega_i)\}_{t=1}^T \quad (4)$$

where $m_i^t$ represents the instance segmentation result (for example, mask) determined in the t-th frame for the i-th video instance, and Mask Head ( ) represents the segmentation result generation layer, which may, for example be, based on convolution operations.

Although the above describes the use of frame-level features in determining instance segmentation results, in some embodiments, when determining the instance segmentation results of video instances, frame-level features may not be considered, but the instance segmentation results of video instances may only be determined based on the feature map of each frame and video-level features.

It should be understood that the segmenter 350, the classifier 360 and the boundary box locator 370 may be included in the video processing model 105 according to the needs of the analysis task, one or more of them may be omitted, or may include a module for determining analyzes results of other analysis tasks.

In the example of FIG. 3, analysis results 140 for the three analysis tasks of segmentation, classification, and boundary box localization may respectively indicate, in each frame of video 130, mask of each video instance (in this example, a skateboarder and a skateboarder) and boundary box for locating each video instance. The analysis results 140 may also indicate classification results (for example, indicated by different annotations) of the video instances that appear in various frames of the video 130.

In each of the above embodiments regarding the working principle of the video processing model 105, in order to implement the corresponding functions, the parameter values of the following parts of the video processing model 105 may be determined through the training process, including the feature extraction network 310, the encoder 320, the spatial attention mechanism module 332 of respective processing layer 330 if the decoder, the weight calculation layer 342 of each processing layer 330 in the decoder, and the segmenter 350, classifier 360 and boundary box locator 370 that perform corresponding analysis tasks.

In some embodiments, the parameter values of these parts can be determined through end-to-end training. The training process of the video processing model 105 can be implemented, for example, by the model training system 110 of FIG. 1. The training data of the video processing model 105 may include the input of the model, that is, sample videos, and the output of the model, that is, annotation information of the input sample-level in various video analysis tasks.

In some embodiments, the annotation information may include annotation information corresponding to each real video instance in the sample video. Assume that y represents a set of real video instances of a certain sample video, and $\hat{y}_i=\{\hat{y}_i\}_{i=1}^{N}$ represents a set of video instances predicted by the video processing model 105, where $\hat{y}_i$ represents predicted results for N predetermined number of video instances. Assume that the video processing model 105 includes a segmenter 350, a classifier 360, and a boundary box locator 370. The i-th element in the set of real video instances can be represented as $y_i=\{c_i, (b_{i,1}, b_{i,2}, \ldots, b_{i,T})\}$, where $c_i$ represents a real classification result of the i-th video instance (It can be an empty set $\emptyset$), and $b_{i,t} \in [0, 1]^4$; is a vector that defines real boundary box information of the i-th video instance in the t-th frame (including the center coordinates (x and y coordinates), height and width of the boundary box).

During the training process, the sample video is input to the video processing model 105. Each part in the video processing model 105 processes the sample video based on the current parameter values, and the segmenter 350, the classifier 360 and the boundary box locator 370 output predicted results. Parameter values of the video processing model 105 are initialized initially and updated iteratively during the training process.

For the video instance with index σ(i), the predicted classification results $\hat{p}_{\sigma(i)}(c_i)$ output by the classifier 360 and the predicted boundary box information $\hat{b}_{\sigma(i)}$ output by the boundary box locator 370 can be obtained. During training, a cost function may be constructed to determine updates to parameter values of the video processing model 105. The cost function can be constructed based on the matching error between the predicted classification results $\hat{p}_{\sigma(i)}(c_i)$ and real classification results and matching error between predicted boundary box information $\hat{b}_{\sigma(i)}$ and boundary box information, which can be expressed as:

$$\mathcal{L}_{match}(y_i, \hat{y}_{\sigma(i)}) = -\hat{p}_{\sigma(i)}(c_i) + \mathcal{L}_{box}(b_i, \hat{b}_{\sigma(i)}) \quad (5)$$

where $c_i \neq \emptyset$; $\mathcal{L}_{box}(b_i, \hat{b}_{\sigma(i)})$ represents the error function constructed based on the error between the predicted boundary box information $\hat{b}_{\sigma(i)}$ and the real boundary box information $b_i$; $\mathcal{L}_{match}(y_i, \hat{y}_{\sigma(i)})$ represents the total loss function based on the error between the classification result and the boundary box information.

In the loss function $\mathcal{L}_{match}(y_i, \hat{y}_{\sigma(i)})$ of formula (5), the error between the instance segmentation result output by the segmenter 350 and the real instance segmentation result is not directly considered, because the amount of such error calculation is huge. In order to better align the real analysis results and predicted results for the sample video under each analysis task, for N elements, the lowest cost for N elements $\sigma \in S_n$ arrangement can be searched, which is expressed as follows:

$$\hat{\sigma} = \underset{\sigma \in S_n}{\operatorname{argmin}} \sum_{i}^{N} \mathcal{L}_{match}(y_i, \hat{y}_{\sigma(i)}) \quad (6)$$

In some embodiments, the Hungarian algorithm can be used to solve the optimal alignment in formula (6). Assuming that the optimal alignment is $\hat{\sigma}$, the video processing model 105 can be trained using the Hungarian loss of all matching errors for N video instances, which can be expressed as:

$$\mathcal{L}_{Hung}(y, \hat{y}) = \sum_{i=1}^{N} [-\log \hat{p}_{\hat{\sigma}(i)}(c_i) + \mathbb{1}_{\{c_i \neq \emptyset\}} \mathcal{L}_{box}(b_i, \hat{b}_{\hat{\sigma}}(i)) + \mathbb{1}_{\{c_i \neq \emptyset\}} \mathcal{L}_{mask}(m_i, \hat{m}_{\hat{\sigma}}(i))]. \quad (7)$$

where the loss function $\mathcal{L}_{box}$ corresponding to the boundary box information can be based on $\mathcal{L}_{1\ loss}$ and generalized IoU loss, and the loss function $\mathcal{L}_{mask}$ corresponding to the instance segmentation result is defined as a combination of Dice and Focal losses. In an implementation, the error corresponding to the boundary box information and instance segmentation results can be calculated for each frame of the sample video, and the loss functions $\mathcal{L}_{box}$ and $\mathcal{L}_{mask}$ can be determined by averaging the plurality of frames in the sample video.

During the training process, the update of parameter values for each part in the video processing model 105 may be determined by stochastic gradient descent or other deformation methods, based on the loss function of formula (7). The update of parameter values can be performed iteratively until the training goal is reached, such as minimizing the loss function, or the number of iterations reaches a predetermined goal.

Example embodiments for training the video processing model 105 in an end-to-end manner are described above. In other embodiments, other loss functions or cost functions can also be constructed through other training algorithms to train video processing models 105. Embodiments of the present disclosure are not limited in this respect.

Figure 4:
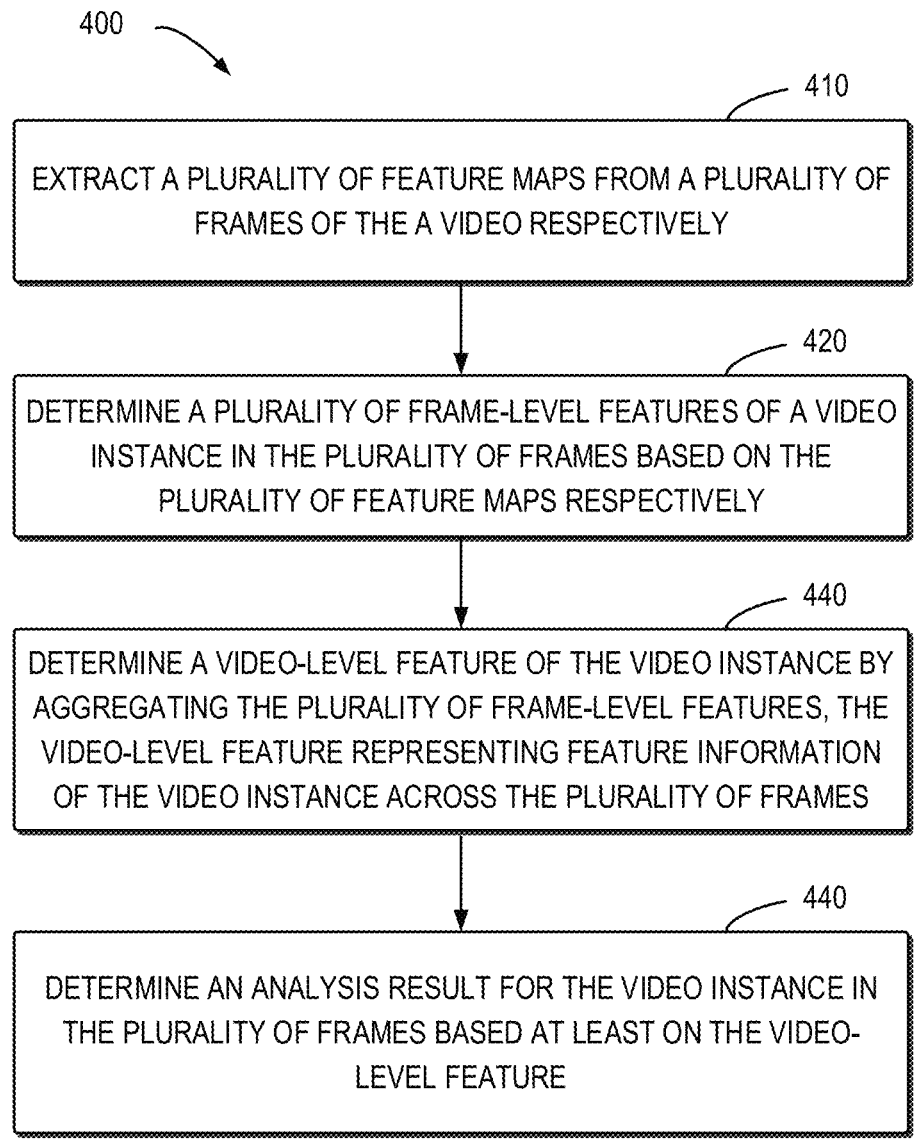
FIG. 4 shows a flowchart of a video processing method according to some embodiments of the present disclosure.

FIG. 4 illustrates a flow diagram of a process 400 for video processing in accordance with some embodiments of the present disclosure. The process 400 may be implemented at the model application system 120.

At block 410, the model application system 120 extracts a plurality of feature maps from a plurality of frames of the video respectively. At block 420, the model application system 120 determines a plurality of frame-level features of a video instance in the plurality of frames based on the plurality of feature maps, a frame-level feature in each of the frames represents feature information of the video instance in the frame.

In some embodiments, when determining the plurality of frame-level features, a plurality of frame-level features of the video instance in the plurality of frames may be determined, using a spatial attention mechanism, based on the plurality of feature maps. In some embodiments, the plurality of frame-level features is determined by a plurality of connected processing layers iteratively. When determining the plurality of frame-level features, an initial video-level feature of the video instance can be obtained; at the first processing layer of the plurality of processing layers, a plurality of intermediate frame-level features of the video instance at the first processing layer are generated based on the initial video-level feature and the plurality of feature maps; at each subsequent processing layer after the first processing layer amongst the plurality of processing layers, a plurality of intermediate frame-level features of the video instance at the subsequent processing layer are generated based on a plurality of intermediate frame-level features generated in a previous processing layer and the plurality of feature maps; and a plurality of intermediate frame-level features generated at a last processing layer of the plurality of processing layers are determined as the plurality of frame-level features.

At block 430, the model application system 120 determines a video-level feature of the video instance by aggregating the plurality of frame-level features, the video-level feature representing feature information of the video instance across the plurality of frames.

In some embodiments, when determining the video-level feature of the video instance, a plurality of weights for the plurality of frame-level features may be determined; and the video-level feature of the video instance is determined by weighting the plurality of frame-level features with the plurality of weights.

In some embodiments, the plurality of frame-level features is determined by a plurality of connected processing layers iteratively. In such embodiments, when determining the video-level feature of the video instance, for each of the plurality of processing layers except for a last processing layer, a plurality of intermediate frame-level features of the video instance generated at the processing layer are obtained; a plurality of weights for the plurality of intermediate frame-level features are determined; an intermediate video-level feature at the processing layer is determined by weighting the plurality of intermediate frame-level features with the determined weights; the video-level feature of the video instance is generated based on intermediate video-level features determined for each of the processing layers and the intermediate video-level feature obtained by weighting the plurality of frame-level features.

In some embodiments, the plurality of weights for the plurality of frame-level features are generated by applying the plurality of frame-level features to a trained weight calculation layer, respectively. The weight calculation layer is trained jointly with a video processing model, and the video processing model is configured to implement the extraction of the plurality of feature maps, the determination of the plurality of frame-level features, the determination of the video-level feature, and the determination of the analysis result.

At block 440, the model application system 120 determines an analysis result for the video instance in the plurality of frames based at least on the video-level feature.

In some embodiments, when determining the analysis result, an instance segmentation result in the plurality of frames is determined based at least on the video-level feature of the video instance and the plurality of feature maps, the instance segmentation result indicating a pixel part of each of the plurality of frames that presents the video instance. In some embodiments, when determining the instance segmentation result in each of the plurality of frames, an instance segmentation result in each frame of the plurality of frames may be further determined based on the plurality of frame-level features of the video instance in the plurality of frames, respectively.

In some embodiments, when determining the analysis result, an instance classification result of the video instance is determined based on the video-level feature of the video instance, the classification result indicates a probability that the video instance belongs to a predetermined category among a plurality of predetermined categories.

In some embodiments, the model application system 120 may also determine the boundary box information of the video instance in at least one frame based on the frame-level feature of the video instance in at least one frame of the plurality of frames respectively, the boundary box information indicates a boundary box coordinate of the video instance in the at least one frame.

In some embodiments, a predetermined number of video instances is determined for the video, and for each video instance of the predetermined number of video instances, a determination of a plurality of frame-level features of the video instance in the plurality of frames, a determination of video-level feature of the video instance, and an analysis result for the video instance in the plurality of frames are performed.

Figure 5:
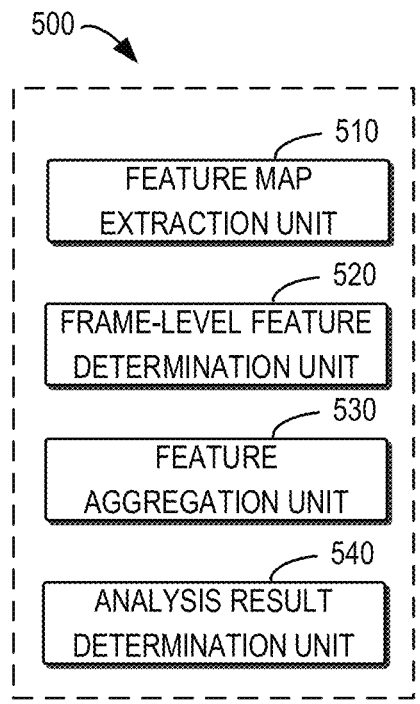
FIG. 5 shows a block diagram of a video processing apparatus according to some embodiments of the present disclosure.

FIG. 5 shows a block diagram of an apparatus for video processing 500 in accordance with some embodiments of the present disclosure. The apparatus 500 may be implemented as or included in model application system 120. Each module/component in the apparatus 500 may be implemented by hardware, software, firmware, or any combination thereof.

As shown in the figure, the apparatus 500 includes a feature map extraction unit 510 configured to extract a plurality of feature maps from a plurality of frames of a video respectively. The apparatus 500 further includes a frame-level feature determination unit 520 configured to determine a plurality of frame-level features of a video instance in the plurality of frames based on the plurality of feature maps respectively, a frame-level feature in each of the frames representing feature information of the video instance in the frame. The apparatus 500 further includes a feature aggregation unit 530 configured to determine a video-level feature of the video instance by aggregating the plurality of frame-level features, the video-level feature representing feature information of the video instance across the plurality of frames. The apparatus 500 further includes an analysis result determination unit 540 configured to determine an analysis result for the video instance in the plurality of frames based at least on the video-level feature.

In some embodiments, the frame-level feature determination unit 520 may be configured to determine, using a spatial attention mechanism, a plurality of frame-level features of the video instance in the plurality of frames based on the plurality of feature maps.

In some embodiments, the plurality of frame-level features is determined by a plurality of connected processing layers iteratively. In some embodiments, the frame-level feature determination unit 520 may be configured to: obtain an initial video-level feature of the video instance; at a first processing layer of the plurality of processing layers, generate a plurality of intermediate frame-level features of the video instance at the first processing layer based on the initial video-level feature and the plurality of feature maps; at each subsequent processing layer after the first processing layer amongst the plurality of processing layers, generate a plurality of intermediate frame-level features of the video instance at the subsequent processing layer based on a plurality of intermediate frame-level features generated in a previous processing layer and the plurality of feature maps; determine a plurality of intermediate frame-level features generated at a last processing layer of the plurality of processing layers as the plurality of frame-level features.

In some embodiments, the feature aggregation unit 530 may be configured to determine a plurality of weights for the plurality of frame-level features; and determine the video-level feature of the video instance by weighting the plurality of frame-level features with the plurality of weights.

In some embodiments, the plurality of frame-level features is determined by a plurality of connected processing layers iteratively. In some embodiments, the feature aggregation unit 530 may be configured to for each of the plurality of processing layers except for a last processing layer, obtain a plurality of intermediate frame-level features of the video instance generated at the processing layer; determine a plurality of weights for the plurality of intermediate frame-level features; determine an intermediate video-level feature at the processing layer by weighting the plurality of intermediate frame-level features with the determined weights; generate the video-level feature of the video instance based on intermediate video-level features determined for each of the processing layers and the intermediate video-level feature obtained by weighting the plurality of frame-level features.

In some embodiments, determining the plurality of weights for the plurality of frame-level features includes generating the plurality of weights for the plurality of frame-level features by applying the plurality of frame-level features to a trained weight calculation layer, respectively. The weight calculation layer is trained jointly with a video processing model, and the video processing model is configured to implement the extraction of the plurality of feature maps, the determination of the plurality of frame-level features, the determination of the video-level feature, and the determination of the analysis result.

In some embodiments, the analysis result determination unit includes a segmentation result determination unit configured to: determine an instance segmentation result in the plurality of frames based at least on the video-level feature of the video instance and the plurality of feature maps, the instance segmentation result indicating a pixel part of each of the plurality of frames that presents the video instance.

In some embodiments, the analysis result determination unit includes a classification result determination unit configured to determine an instance classification result of the video instance based on the video-level feature of the video instance, the classification result indicating a probability that the video instance belongs to a predetermined category among a plurality of predetermined categories.

In some embodiments, determining the instance segmentation result in each frame of the plurality of frames further includes determining an instance segmentation result in each frame of the plurality of frames further based on the plurality of frame-level features of the video instance in the plurality of frames, respectively.

In some embodiments, the apparatus 600 may further include a boundary box positioning unit configured to based on a frame-level feature of the video instance in at least one frame of the plurality of frames, determining boundary box information of the video instance in the at least one frame respectively, the boundary box information indicating a boundary box coordinate of the video instance in the at least one frame.

In some embodiments, a predetermined number of video instances is determined for the video, and for each video instance of the predetermined number of video instances, a determination of a plurality of frame-level features of the video instance in the plurality of frames, a determination of video-level feature of the video instance, and an analysis result for the video instance in the plurality of frames are performed.

Figure 6:
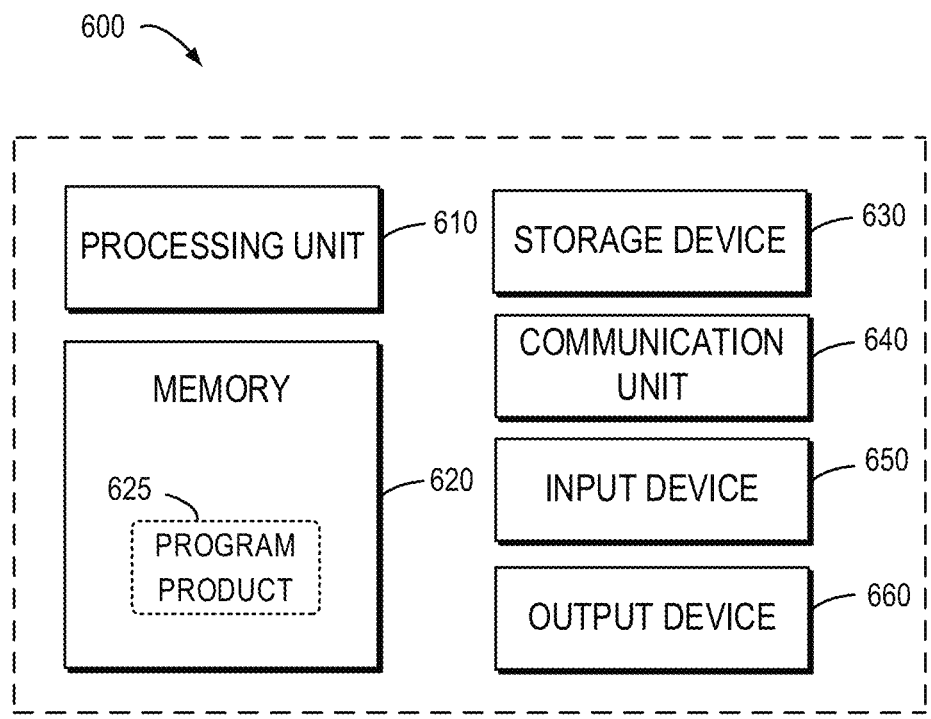
FIG. 6 illustrates a block diagram of a computing device/system in which one or more embodiments of the present disclosure may be implemented.

FIG. 6 shows a block diagram of a computing device/system 600 in which one or more embodiments of the present disclosure may be implemented. It would be appreciated that the computing device/system 600 shown in FIG. 6 is only an example and should not constitute any restriction on the function and scope of the embodiments described herein. The computing device/system 600 shown in FIG. 6 may be used for implementing the model training system 110 and/or the model application system 120 shown in FIG. 1.

As shown in FIG. 6, the computing device/system 600 is in the form of a general computing device. The components of the computing device/system 600 may include, but are not limited to, one or more processors or processing units 610, a memory 620, a storage device 630, one or more communication units 640, one or more input devices 650, and one or more output devices 660. The processing units 610 may be an actual or virtual processors and can execute various processes according to the programs stored in the memory 620. In a multiprocessor system, multiple processing units execute computer executable instructions in parallel to improve the parallel processing capability of the computing device/system 600.

The computing device/system 600 typically includes a variety of computer storage media. Such media can be any available media that is accessible to the computing device/system 600, including but not limited to volatile and non-volatile media, removable and non-removable media. The memory 620 can be volatile memory (such as registers, caches, random access memory (RAM)), nonvolatile memory (such as a read-only memory (ROM), an electrically erasable programmable read-only memory (EEPROM), a flash memory), or some combination thereof. The storage device 630 can be any removable or non-removable medium, and can include machine-readable medium, such as a flash drive, a disk, or any other medium which can be used to store information and/or data (for example, training data for training) and can be accessed within the computing device/system 600.

The computing device/system 600 may further include additional removable/non-removable, volatile/non-volatile storage medium. Although not shown in FIG. 6, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 620 can include a computer program product 625, which comprises one or more program modules configured to execute various methods or actions of the various embodiments disclosed herein.

The communication unit 640 implements communication with other electronic devices via a communication medium. In addition, functions of components in the computing device/system 600 may be implemented by a single computing cluster or multiple computing machines, which can communicate through a communication connection. Therefore, the computing device/system 600 may be operated in a networking environment using a logical connection with one or more other servers, a network personal computer (PC), or another network node.

The input device 650 may be one or more input devices, such as a mouse, a keyboard, a trackball, etc. The output device 660 may be one or more output devices, such as a display, a speaker, a printer, etc. The computing device/system 600 may also communicate with one or more external devices (not shown) through the communication unit 640 as required. The external device, such as a storage device, a display device, etc., communicate with one or more devices that enable users to interact with the computing device/system 600, or communicate with any device (for example, a network card, a modem, etc.) that makes the computing device/system 600 communicate with one or more other computing devices. Such communication may be executed via an input/output (I/O) interface (not shown).

According to example implementation of the present disclosure, there is provided a computer-readable storage medium on which a computer-executable instruction or computer program is stored, wherein the computer-executable instructions are executed by a processor to implement the methods described above.

Various aspects of the present disclosure are described herein with reference to the flow chart and/or the block diagram of the method, the device, the apparatus and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

The invention claimed is:

1. A method for video processing, comprising:
   extracting a plurality of feature maps from a plurality of frames of a video respectively;
   determining a plurality of frame-level features of a video instance in the plurality of frames based on the plurality of feature maps respectively, a frame-level feature in each of the frames representing feature information of the video instance in the frame, wherein the plurality of frame-level features is determined by a plurality of connected processing layers iteratively, and wherein determining the plurality of frame-level features of the video instance in the plurality of frames based on the plurality of feature maps respectively comprises:
   obtaining an initial video-level feature of the video instance;
   at a first processing layer of the plurality of processing layers, generating a plurality of intermediate frame-level features of the video instance at the first processing layer based on the initial video-level feature and the plurality of feature maps;
   at each subsequent processing layer after the first processing layer amongst the plurality of processing layers, generating a plurality of intermediate frame-level features of the video instance at the subsequent processing layer based on a plurality of intermediate frame-level features generated in a previous processing layer and the plurality of feature maps; and
   determining a plurality of intermediate frame-level features generated at a last processing layer of the plurality of processing layers as the plurality of frame-level features;
   determining a video-level feature of the video instance by aggregating the plurality of frame-level features, the video-level feature representing feature information of the video instance across the plurality of frames; and determining an analysis result for the video instance in the plurality of frames based at least on the video-level feature.

2. The method of claim 1, wherein determining a plurality of frame-level features of the video instance in the plurality of frames based on the plurality of feature maps respectively comprises:

determining, using a spatial attention mechanism, a plurality of frame-level features of the video instance in the plurality of frames based on the plurality of feature maps.

3. The method of claim 1, wherein determining the video-level feature of the video instance by aggregating the plurality of frame-level features comprises:

determining a plurality of weights for the plurality of frame-level features; and determining the video-level feature of the video instance by weighting the plurality of frame-level features with the plurality of weights.

4. The method of claim 3, wherein the plurality of frame-level features is determined by a plurality of connected processing layers iteratively, and wherein determining the video-level feature of the video instance by weighting the plurality of frame-level features with the plurality of weights comprises:

for each of the plurality of processing layers except for a last processing layer,
obtaining a plurality of intermediate frame-level features of the video instance generated at the processing layer;
determining a plurality of weights for the plurality of intermediate frame-level features;
determining an intermediate video-level feature at the processing layer by weighting the plurality of intermediate frame-level features with the determined weights; and
generating the video-level feature of the video instance based on intermediate video-level features determined for each of the processing layers and the intermediate video-level feature obtained by weighting the plurality of frame-level features.

5. The method of claim 3, wherein determining the plurality of weights for the plurality of frame-level features comprises:

generating the plurality of weights for the plurality of frame-level features by applying the plurality of frame-level features to a trained weight calculation layer, respectively, wherein the weight calculation layer is trained jointly with a video processing model, and the video processing model is configured to implement the extraction of the plurality of feature maps, the determination of the plurality of frame-level features, the determination of the video-level feature, and the determination of the analysis result.

6. The method of claim 1, wherein determining the analysis result for the video instance in the plurality of frames based at least on the video-level feature comprises:

determining an instance segmentation result in the plurality of frames based at least on the video-level feature of the video instance and the plurality of feature maps, the instance segmentation result indicating a pixel part of each of the plurality of frames that presents the video instance.

7. The method of claim 1, wherein determining the analysis result for the video instance in the plurality of frames based at least on the video-level feature comprises:

determining an instance classification result of the video instance based on the video-level feature of the video instance, the classification result indicating a probability that the video instance belongs to a predetermined category among a plurality of predetermined categories.

8. The method of claim 6, wherein determining the instance segmentation result in each frame of the plurality of frames further comprises:

determining an instance segmentation result in each frame of the plurality of frames further based on the plurality of frame-level features of the video instance in the plurality of frames, respectively.

9. The method of claim 1, further comprising:

based on a frame-level feature of the video instance in at least one frame of the plurality of frames, determining boundary box information of the video instance in the at least one frame respectively, the boundary box information indicating a boundary box coordinate of the video instance in the at least one frame.

10. The method of claim 1, wherein a predetermined number of video instances is determined for the video, and for each video instance of the predetermined number of video instances, a determination of a plurality of frame-level features of the video instance in the plurality of frames, a determination of video-level feature of the video instance, and an analysis result for the video instance in the plurality of frames are performed.

11. A system for video processing, comprising:

at least one processing unit; and at least one memory coupled to the at least one processing unit and storing instructions for execution by the at least one processing unit, the instructions when executed by the at least one processing unit causes the system to perform acts of:

extracting a plurality of feature maps from a plurality of frames of a video respectively;

determining a plurality of frame-level features of a video instance in the plurality of frames based on the plurality of feature maps respectively, a frame-level feature in each of the frames representing feature information of the video instance in the frame, wherein the plurality of frame-level features is determined by a plurality of connected processing layers iteratively, and wherein determining the plurality of frame-level features of the video instance in the plurality of frames based on the plurality of feature maps respectively comprises:

obtaining an initial video-level feature of the video instance;

at a first processing layer of the plurality of processing layers, generating a plurality of intermediate frame-level features of the video instance at the first processing layer based on the initial video-level feature and the plurality of feature maps;

at each subsequent processing layer after the first processing layer amongst the plurality of processing layers, generating a plurality of intermediate frame-level features of the video instance at the subsequent processing layer based on a plurality of intermediate frame-level features generated in a previous processing layer and the plurality of feature maps; and determining a plurality of intermediate frame-level features generated at a last processing layer of the plurality of processing layers as the plurality of frame-level features;

determining a video-level feature of the video instance by aggregating the plurality of frame-level features, the video-level feature representing feature information of the video instance across the plurality of frames; and determining an analysis result for the video instance in the plurality of frames based at least on the video-level feature.

12. The system of claim 11, wherein determining a plurality of frame-level features of the video instance in the plurality of frames based on the plurality of feature maps respectively comprises:

determining, using a spatial attention mechanism, a plurality of frame-level features of the video instance in the plurality of frames, based on the plurality of feature maps.

13. The system of claim 11, wherein determining the video-level feature of the video instance by aggregating the plurality of frame-level features comprises:

determining a plurality of weights for the plurality of frame-level features; and determining the video-level feature of the video instance by weighting the plurality of frame-level features with the plurality of weights.

14. The system of claim 13, wherein the plurality of frame-level features is determined by a plurality of connected processing layers interactively, and wherein determining the video-level feature of the video instance by weighting the plurality of frame-level features with the plurality of weights comprises:

for each of the plurality of processing layers except for a last processing layer,
obtaining a plurality of intermediate frame-level features of the video instance generated at the processing layer;
determining a plurality of weights for the plurality of intermediate frame-level features;
determining an intermediate video-level feature at the processing layer by weighting the plurality of intermediate frame-level features with the determined weights;

generating the video-level feature of the video instance based on intermediate video-level features determined for each of the processing layers and the intermediate video-level feature obtained by weighting the plurality of frame-level features.

15. The system of claim 13, wherein determining the plurality of weights for the plurality of frame-level features comprises:

generating the plurality of weights for the plurality of frame-level features by applying the plurality of frame-level features to a trained weight calculation layer, respectively, wherein the weight calculation layer is trained jointly with a video processing model, and the video processing model is configured to implement the extraction of the plurality of feature maps, the determination of the plurality of frame-level features, the determination of the video-level feature, and the determination of the analysis result.

16. The system of claim 11, wherein determining the analysis result for the video instance in the plurality of frames based at least on the video-level feature comprises:

determining an instance segmentation result in the plurality of frames based at least on the video-level feature of the video instance and the plurality of feature maps, the instance segmentation result indicating a pixel part of each of the plurality of frames that presents the video instance.

17. The system of claim 11, wherein determining the analysis result for the video instance in the plurality of frames based at least on the video-level feature comprises:

determining an instance classification result of the video instance based on the video-level feature of the video instance, the classification result indicating a probability that the video instance belongs to a predetermined category among a plurality of predetermined categories.

18. A non-transitory computer-readable storage medium storing a computer program is thereon, the computer program, when executed by a processing unit, performs acts of:

extracting a plurality of feature maps from a plurality of frames of a video respectively;

determining a plurality of frame-level features of a video instance in the plurality of frames based on the plurality of feature maps respectively, a frame-level feature in each of the frames representing feature information of the video instance in the frame, wherein the plurality of frame-level features is determined by a plurality of connected processing layers iteratively, and wherein determining the plurality of frame-level features of the video instance in the plurality of frames based on the plurality of feature maps respectively comprises:

obtaining an initial video-level feature of the video instance;

at a first processing layer of the plurality of processing layers, generating a plurality of intermediate frame-level features of the video instance at the first processing layer based on the initial video-level feature and the plurality of feature maps;

at each subsequent processing layer after the first processing layer amongst the plurality of processing layers, generating a plurality of intermediate frame-level features of the video instance at the subsequent processing layer based on a plurality of intermediate frame-level features generated in a previous processing layer and the plurality of feature maps; and determining a plurality of intermediate frame-level features generated at a last processing layer of the plurality of processing layers as the plurality of frame-level features;

determining a video-level feature of the video instance by aggregating the plurality of frame-level features, the video-level feature representing feature information of the video instance across the plurality of frames; and determining an analysis result for the video instance in the plurality of frames based at least on the video-level feature.

* * * * *